Nov. 14, 1950          W. J. FIELD          2,529,490
MOTOR CONTROL SYSTEM
Original Filed Dec. 30, 1943
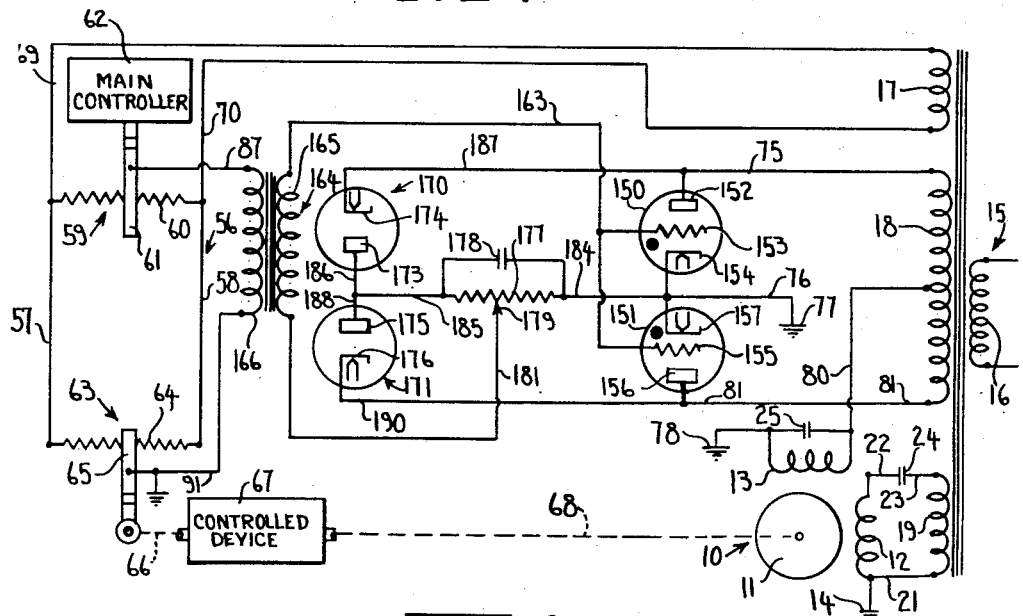
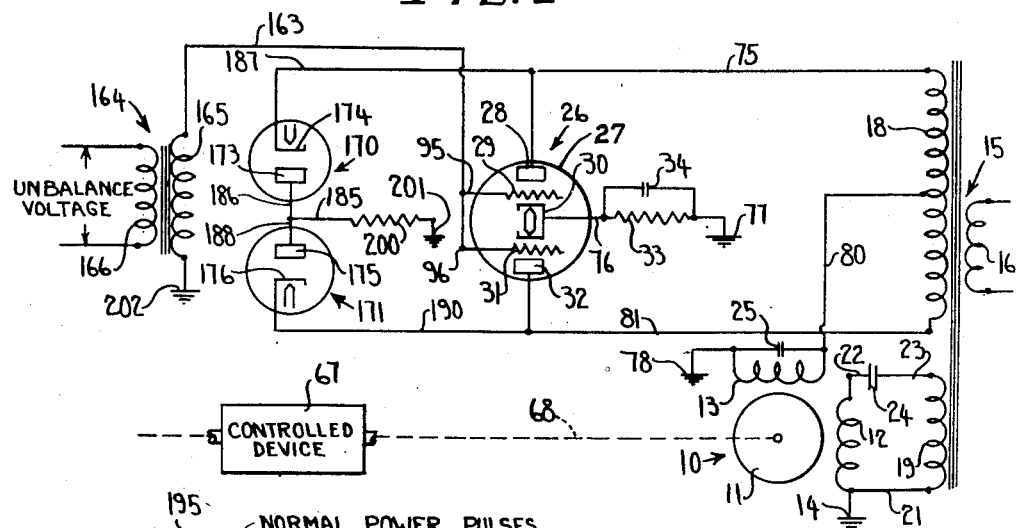
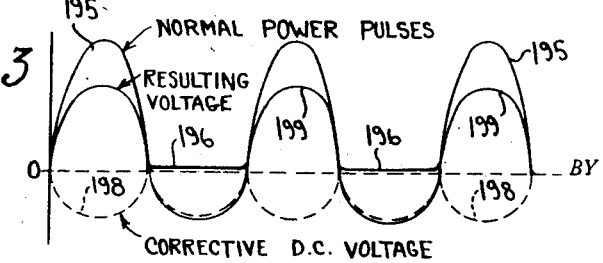
INVENTOR.
WILLIAM J. FIELD
BY
George H Fisher
ATTORNEY Patented Nov. 14, 1950

2,529,490

UNITED STATES PATENT OFFICE 2,529,490

MOTOR CONTROL SYSTEM

William J. Field, Minneapolis, Minn., assignor to Minneapolis-Honeywell Regulator Company, Minneapolis, Minn., a corporation of Delaware Original application December 30, 1943, Serial No. 516,237. Divided and this application November 12, 1948, Serial No. 59,608

18 Claims. (Cl. 318—212)

1

The present invention is concerned with a motor control system and more particularly with one in which provision is made for quickly terminating operation of the motor, and is a divisional application of my application 516,237, filed December 30, 1943.

It is quite customary in certain motor control systems to control the energization of a motor in accordance with the value of a controlling condition. The motor is often used in such systems to position a condition controlling device and if the regulation of the condition is to be maintained as accurately as possible, it is desirable that the operation of the motor terminate quickly when the value of the condition is such as to no longer call for motor operation. Accordingly, various arrangements have been devised for quickly terminating the operation of the motor upon the value of the controlling condition being such that motor operation is no longer desired. In some cases, such braking arrangements have been in the form of mechanical brakes whether constantly applied or applied at the time of stopping of the motor. In other cases, auxiliary electrical windings have been employed for braking purposes.

It is an object of the present invention to provide means for braking an alternating current motor without the use of auxiliary windings or mechanical devices. In general, this is accomplished by supplying direct current to one of the windings of the motor.

A further object of the present invention is to provide an alternating current motor control system in which the braking is accomplished by rectifying an alternating voltage applied to one of the windings so that the current flowing through the winding has a direct current component.

A further object of the invention is to provide a motor control system in which a motor is energized by a cyclically varying voltage having a unidirectional component and in which means is provided for continuously applying to the motor a unidirectional component of such polarity and magnitude as to cause the wave form of the cyclically varying voltage to approach the wave form of an alternating voltage, the unidirectional voltage being effective when the cyclically varying voltage is substantially removed to cause a braking effect.

A still further object of the invention is to provide generally a control system for controlling the energization of an alternating current operated device in which the energization of the device is controlled by an electronic rectifier and in which a unidirectional voltage is applied to the device to cause the wave form of the resulting voltage to approximate more nearly that of an alternating voltage.

Other objects of the present invention will be apparent from a consideration of the accompanying specification, claims, and drawings, of which:

Figure 1 is a schematic view of one modification of my control system,

Figure 2 is a schematic view of a modified form of my control system, and

Figure 3 is a diagram indicating the effect of a corrective unidirectional voltage that is employed in the systems of Figures 1 and 2.

Referring to Figure 1 of the drawing for a more detailed understanding of the invention, the reference numeral 10 is employed to indicate generally a split phase motor. This motor comprises a rotor 11, preferably of the squirrel cage type. Associated with the rotor 11 are field windings 12 and 13.

A reference numeral 15 is employed to generally indicate a step-up-step-down transformer. The transformer 15 comprises a line voltage primary 16 which is connected to any suitable source of power (not shown) and a plurality of secondaries 17, 18, and 19. Secondary windings 18 and 19 are preferably higher voltage windings than the primary winding 16 while winding 17 is preferably a lower voltage winding.

The field winding 12 is connected to secondary winding 19 through conductors 21, 22, and 23 and a condenser 24. The condenser 24 is connected in series with field winding 12, it will be noted, and serves to displace in phase the current flowing to field winding 12. The lower end of field winding 12 is connected to ground at 14. A condenser 25 is connected in parallel with field winding 13. The energization of the field winding 13 and the parallel condenser 25 is controlled by the gas filled triode discharge devices 150 and 151. The discharge device 150 comprises a gas filled envelope in which is located an anode 152, a control grid 153 and a cathode 154, while discharge device 151 comprises a gas filled envelope in which is located a second anode 156, a control grid 155, and a cathode 157. It is to be understood that the cathodes can be of either the directly heated or indirectly heated type. In the particular case of tubes 150 and 151, the cathodes are of the indirectly heated type. Since the manner in which the cathodes are heated forms no part of the present invention, the arrangements for heating the cathodes will not be discussed in connection with tubes 150 and 151 or any of the other electronic devices of this or the other of the two species. It is to be understood that in both of the species, the electronic devices are of the type employing hot cathodes although the invention is in no way limited to the use of such tubes.

The tubes 150 and 151 control the current flow through winding 13. The potential of grids 153 and 155 is in turn controlled by a normally balanced bridge generally indicated by the reference numeral 56. This bridge comprises two potentiometers 59 and 63. The potentiometer 59 constitutes the control potentiometer and comprises a resistance 60 and a contact arm 61 in slidable engagement with resistor 60. The position of contact arm 61 is controlled by a main controller schematically indicated in the drawing and designated by the reference numeral 62. The nature of the main controller 62 will depend upon the application of the motor control system. For example, the main controller may be a gyroscope if the rotor is to be used to control the rudder of an airplane. On the other hand, the main controller 62 may be a temperature responsive device if the motor control system is to be employed for the control of temperature.

The potentiometer 63 constitutes a follow up potentiometer. This potentiometer comprises a resistor 64 and a contact arm 65 in slidable engagement with the resistor 64. The contact arm 65 is secured to a shaft 66 associated with a controlled device 67. The controlled device is in turn connected by a shaft 68 to the rotor 11. In the majority of cases, the controlled device will include a reduction gear train so that the speed at which the controlled device is driven will be considerably less than the rotor speed. The particular nature of the controlled device will again depend upon the particular application of the motor control system. If the motor control system is employed in connection with an airplane control, the controlled device might be a rudder. On the other hand, in a temperature control system, the controlled device might be a steam valve, for example. In any event, the position of the contact arm 65 will depend upon the position of the controlled device 67.

The outer terminals of resistors 60 and 64 are connected together by conductors 57 and 58. The outer terminals of resistors 60 and 64 are further both connected by conductors 69 and 70 to the terminals of secondary winding 17. Thus, an alternating voltage is constantly applied to the outer terminals of resistors 60 and 64. The contact arms 61 and 65 constitute the output terminals of the bridge and the voltage existing between these two terminals is dependent upon the relative positions of the contact arms. The output voltage of bridge 56 is applied to tubes 150 and 151 through a transformer 164 having a primary 166 connected to contact arms 61 and 65 through conductors 87 and 91 and a secondary 165 having its upper terminal connected to the grids 153 and 155 of tubes 150 and 151 respectively through a conductor 163.

A pair of tubes 170 and 171 are employed as rectifiers for supplying a corrective direct current. Each of the tubes 170 and 171 is a vacuum type diode. Tube 170 comprises an anode 173 and a cathode 174. The tube 171 comprises an anode 175 and a cathode 176.

The diodes 170 and 171 are also employed to supply a biasing potential to the grids 153 and 155 of tubes 150 and 151. This is accomplished through a resistor 177 and a condenser 178 connected in parallel with the resistance. Slidably engaged with resistor 177 is a contact 179. The contact 179 is connected by conductor 181 with the terminal of secondary 165 opposite to the terminal to which grids 153 and 155 are connected.

*Operation of species of Figure 1*

Upon the bridge being unbalanced in either direction, an alternating voltage will be induced in secondary 165. The phase position of this alternating voltage will depend upon the direction of unbalance.

Depending upon the phase position of the alternating voltage induced in secondary 165, one or the other of the triodes 150 or 151 will become more conductive and the other less conductive. As a result, an alternating current will flow through winding 13. It is to be understood, however, that this alternating current is not a pure alternating current but rather a rectified alternating current. To a certain extent, the condenser 25 will round the portion of the current wave that would otherwise be flat. Nevertheless, the resulting wave still has a very pronounced direct current component which also serves to distort the wave form.

At all times a circuit may be traced from the secondary 18 through each of the diodes 170 and 171. The circuit through diode 170 is as follows: from the center terminal of secondary 18 through conductor 80, winding 13, ground connections 78 and 77, conductor 76, conductor 184, resistor 177, conductors 185 and 186, anode 173, cathode 174, and conductors 187 and 75 to the upper terminal of secondary 18. During the opposite half cycle the current flows through diode 171 as follows: from the center tap of secondary 18, through conductor 80, motor winding 13, ground connections 78 and 77, conductor 76, conductor 184, resistor 177, conductors 185 and 188, anode 175, cathode 176, and conductors 190 and 81 to the lower terminal of secondary 18. It will be seen from the above that the two diodes 170 and 171 act together as a full wave rectifier so that the current flowing through winding 13 and resistor 177 is a full wave rectified current. By reason of the condenser 178, much of the alternating current component of this full wave rectified direct current is filtered out so that the voltage across resistor 177 is substantially a unidirectional constant voltage. Furthermore, the current through winding 13 produced by the action of diodes 170 and 171 is likewise substantially a direct current. It will be noted that this direct current is in a direction opposite to the current flow due to the rectifying action of the triodes 150 and 151. The result is that the two direct current components tend to cancel each other out and produce a wave form more nearly that of an alternating current.

The action of the corrective unidirectional voltage is indicated diagrammatically in Fig. 3. In that figure, the rectified voltage applied to winding 13 is indicated by the light solid line 195. It will be noted that half of this line 195 consists of horizontal portion 196 due to the action of the rectifier. While there is some tendency for condenser 25 to round these peaks, the resulting voltage is still far from an alternating voltage. The dotted line 198 is employed to indicate the corrective unidirectional voltage that is applied by reason of the rectifying action of diodes 170 and 171. The heavy solid line 199 indicates the resulting voltage. It will be noted that the effect of the addition of the unidirectional voltage is to lower the peaks of the rectified voltage and to add a corrective curved portion to the flat portion due to rectification. As a result, the resulting potential is an alternating potential which is shifted only slightly from the zero axis. In other words, the unidirectional component is relatively small.

As soon as the system becomes balanced, the unidirectional voltage introduced by reason of rectifiers 170 and 171 performs a new function. Upon the unbalance voltage disappearing, the unidirectional voltage introduced by reason of the rectifying action of the triodes 150 and 151 likewise disappears so that the only voltage which is applied to winding 13 is that indicated by the dotted line 198. As a result, the winding 13 is now energized by the unidirectional voltage which acts to produce a braking effect.

The direct current introduced by the action of rectifiers 170 and 171 plays a two-fold purpose. During normal operation of the motor, the function of the direct current is to improve the wave form of the current flowing through winding 13. This causes an increase in the speed of the motor. As soon as it is desired to terminate operation of the motor, the direct current then functions to produce a desirable braking effect so as to result in the movement of the motor quickly being terminated.

The rectifiers 170 and 171 have a still further effect. As is previously noted, the circuit through these rectifiers to winding 13 includes the resistor 177. As also pointed out, the two rectifiers function to produce a substantially constant unidirectional voltage across resistor 177. This voltage is applied to bias the grids of tubes 150 and 151. Since the tubes 150 and 151 are gas filled tubes, they are non-conductive when the system is balanced. For this reason, the tubes are unable to supply their own current for biasing the grids negatively. It is to be noted that the connection between grids 153 and 155 and cathodes 154 and 157 includes not only secondary 165 but that portion of resistor 177 to the right of contact 179. As a result, the voltage applied to grids 153 and 155 not only includes the signal voltage but also a voltage of such polarity as to tend to bias the grids 153 and 155 negatively by an amount determined by the position of slider 179.

It will be seen that in the present species, I have provided an arrangement whereby the means for supplying the braking action upon termination of the operation of the motor also functions to improve the operation of the motor by correcting the wave form of the current applied to the motor windings. It will also be seen that the means for supplying the direct current to improve the operation of the motor and to provide a braking action also provides means for biasing the grids of the controlling electronic device negatively so that it is possible to use for this purpose gas filled tubes.

Species of Figure 2

The species of Figure 2 is very similar to that of Figure 1 in that direct current is supplied to winding 13 to correct for the direct current component introduced by reason of the action of the controlling discharge device. The principal difference between the two figures is that a vacuum type triode 26 is employed in lieu of the gas filled tubes 150 and 151.

Tube 26 comprises an envelope 27 which houses a pair of triodes, the tube being of the double triode type. A first of these triodes comprises an anode 28, a control grid 29, and a cathode 30. The cathode 30 is a double cathode and is associated with both triodes. The second triode comprises the cathode 30, a grid 31, and an anode 32.

A resistor 33 and a condenser 34 are connected in parallel with each other and in series with the cathode. The resistor and condenser function to bias the grids 29 and 31. Because a vacuum type triode is used, it is possible for the tube to supply its own bias by reason of the resistor 33 and condenser 34. Consequently, the tubes 170 and 171 do not function as in the species of Figure 1 to supply biasing potential for the tube 26.

Referring to the drawing, the reference numeral 200 is employed to indicate a load resistor which is connected by conductor 185 to the junction of conductors 186 and 188 leading to the two anodes 173 and 175. The right hand terminal of resistor 200 is connected to ground at 201. This right hand terminal is connected through the ground connection 201 and a ground connection 202 to the lower terminal of secondary 165 of the coupling transformer 164.

In the present species, the following circuits exist to winding 13 and the diodes 170 and 171. In the first place, a circuit exists from the midpoint of secondary 18 through conductor 80, winding 13, ground connections 78 and 201, resistor 200, conductors 185 and 186, anode 173, cathode 174, and conductors 187 and 75 to the upper terminal of secondary 18. The following circuit also exists through diode 171: from the center tap of secondary 18 through conductor 80, field winding 13, ground connections 78 and 201, resistor 200, conductors 185 and 188, anode 175, cathode 176, and conductors 190 and 81 to the lower terminal of secondary 18.

It will be seen from the above that the circuits through diodes 170 and 171 correspond identically with the equivalent circuits in Figure 1 with the exception that instead of the resistor 177, a resistance 200 is located in the circuits through the two diodes, this resistance constituting the load resistor. As with the species of Figure 1, the D. C. component introduced into the current flowing through winding 13 by reason of diodes 170 and 171 is opposite in direction to the D. C. component of the current introduced by reason of the action of rectifier 26.

Furthermore, this current functions as soon as the control bridge is rebalanced to cause a braking action so as to quickly terminate movement of the rotor 11.

While I have shown certain specific embodiments of my invention, it is to be understood that this is for purposes of illustration only and that the scope of the invention is to be limited solely by the scope of the appended claims.

I claim as my invention:

1. In a motor control system, an alternating current motor having a field winding, means for selectively applying to said winding a cyclically varying voltage of variable magnitude having a direct voltage component, and means for continuously applying to said winding a unidirectional voltage opposing in polarity the direct voltage component of the cyclically varying voltage so as to cause the wave form of said cyclically varying voltage to approach the wave form of an alternating voltage, said unidirectional voltage being effective when said cyclically varying voltage is reduced beyond a predetermined value to cause a braking effect.

2. In a motor control system, an alternating current motor having a field winding, normally balanced control means, means for applying to said winding a cyclically varying voltage having a unidirectional component, means whereby the magnitude of said voltage is dependent upon the extent of unbalance of said control means, and means for continuously applying to said winding a unidirectional voltage opposing in polarity the unidirectional component of said cyclically varying voltage, said unidirectional voltage being effective when said control means is balanced to cause a braking effect.

3. In a motor control system, an alternating current motor having a field winding, normally balanced control means, a source of alternating voltage, means including an electronic discharge device for applying from said source to said winding a cyclically varying voltage having a unidirectional component due to the rectifying properties of said discharge device, means whereby the magnitude of said voltage is dependent upon the extent of unbalance of said control means, and means including an electronic rectifier connected to said source for continuously applying to said winding a unidirectional voltage opposing in polarity the unidirectional component of said cyclically varying voltage and which creates a braking effect when said control means is balanced.

4. In a motor control system, an alternating current motor having a field winding, normally balanced control means, means including a gas filled electronic discharge device for applying to said winding a cyclically varying voltage having a unidirectional component due to the rectifying properties of said discharge device, said discharge device having a control element, means for varying the potential applied to said control element in accordance with the unbalance of said control means so that the magnitude of said cyclically varying voltage is dependent upon the extent of unbalance of said control means, means for producing a unidirectional voltage, means for applying a portion of said unidirectional voltage to said control element to bias the same, and means for continuously applying to said winding a different portion of said unidirectional voltage opposing in polarity the unidirectional component of said cyclically varying voltage and which creates a braking effect when said control means is balanced.

5. In a motor control system, an alternating current motor having a field winding, normally balanced control means, means including a vacuum type electronic discharge device for applying to said winding a cyclically varying voltage having a unidirectional component due to the rectifying properties of said discharge device, means whereby the magnitude of said voltage is dependent upon the extent of unbalance of said control means, and means including an electronic rectifier for continuously applying to said winding a unidirectional voltage opposing in polarity the unidirectional component of said cyclically varying voltage and which creates a braking effect when said control means is balanced.

6. In a motor control system, an alternating current motor having a field winding, normally balanced control means, means including an electronic discharge device for applying to said winding a cyclically varying voltage having a unidirectional component due to the rectifying properties of said discharge device, said discharge device having a control element, means for varying the potential applied to said control element in accordance with the unbalance of said control means so that the magnitude of said cyclically varying voltage is dependent upon the extent of unbalance of said control means, and means for continuously applying to said winding a unidirectional voltage opposing in polarity the unidirectional component of said cyclically varying voltage and which creates a braking effect when said control means is balanced, said last named means comprising an electronic rectifier connected in parallel with but opposite to said electronic discharge device.

7. In a motor control system, an alternating current motor having a field winding, normally balanced control means, means including a gas filled electronic discharge device for applying to said winding a cyclically varying voltage having a unidirectional component due to the rectifying properties of said discharge device, said discharge device having a control element, means for varying the potential applied to said control element in accordance with the unbalance of said control means so that the magnitude of said cyclically varying voltage is dependent upon the extent of unbalance of said control means, means for producing a unidirectional voltage, means for applying a portion of said unidirectional voltage to said control element to bias the same, and means for continuously applying to said winding a different portion of said unidirectional voltage opposing in polarity the unidirectional component of said cyclically varying voltage such as to improve the operation of the motor when power is applied thereto.

8. In a motor control system, an alternating current motor having a field winding, normally balanced control means, means including a gas filled electronic discharge device for applying to said winding a cyclically varying voltage having a unidirectional component due to the rectifying properties of said discharge device, said discharge device having a control element, means for varying the potential applied to said control element in accordance with the unbalance of said control means so that the magnitude of said cyclically varying voltage is dependent upon the extent of unbalance of said control means, means for producing a unidirectional voltage, means for applying a portion of said unidirectional voltage to said control element to bias the same, and means for continuously applying to said winding a different portion of said unidirectional voltage opposing in polarity the unidirectional component of said cyclically varying voltage such as to improve the operation of the motor when power is applied thereto and which creates a braking effect when said cyclically varying voltage is reduced to zero.

9. In a motor control system, an alternating current motor having a field winding, normally balanced control means, means including a vacuum type electronic discharge device for applying to said winding a cyclically varying voltage having a unidirectional component due to the rectifying properties of said discharge device, means whereby the magnitude of said voltage is dependent upon the extent of unbalance of said control means, and means including an electronic rectifier for continuously applying to said winding a unidirectional voltage opposing in polarity the unidirectional component of said cyclically varying voltage such as to improve the operation of the motor when power is applied thereto.

10. In a motor control system, an alternating current motor having a field winding, normally balanced control means, means including a vacuum type electronic discharge device for applying to said winding a cyclically varying voltage having a unidirectional component due to the rectifying properties of said discharge device, means whereby the magnitude of said voltage is dependent upon the extent of unbalance of said control means, and means including an electronic rectifier for continuously applying to said winding a unidirectional voltage opposing in polarity the unidirectional component of said cyclically varying voltage such as to improve the operation of the motor when power is applied thereto, and which creates a braking effect when said cyclically varying voltage is reduced to zero.

11. In a motor control system, an alternating current motor having a field winding, normally balanced control means, means including an electronic discharge device for applying to said winding a cyclically varying voltage having a unidirectional component due to the rectifying properties of said discharge device, said discharge device having a control element, means for varying the potential applied to said control element in accordance with the unbalance of said control means so that the magnitude of said cyclically varying voltage is dependent upon the extent of unbalance of said control means, and means for continuously applying to said winding a cyclically varying unidirectional voltage opposing in polarity the unidirectional component of said cyclically varying voltage such as to improve the operation of the motor when power is applied thereto.

12. In a motor control system, an alternating current motor having a field winding, normally balanced control means, means including an electronic discharge device for applying to said winding a first cyclically varying voltage having a unidirectional component due to the rectifying properties of said discharge device, said discharge device having a control element, means for varying the potential applied to said control element in accordance with the unbalance of said control means so that the magnitude of said cyclically varying voltage is dependent upon the extent of unbalance of said control means, and means for continuously applying to said winding a second cyclically varying unidirectional voltage opposing in polarity the unidirectional component of said cyclically varying voltage such as to improve the operation of the motor when power is applied thereto and which creates a braking effect when said first cyclically varying voltage is reduced to zero.

13. In a motor control system, in combination: an alternating current motor; means for controlling the application of power from a source of alternating power to said motor, said means including an electronic rectifier having a control electrode and which operates to supply a rectified alternating voltage to said motor in accordance with the potential of said control electrode, said rectified voltage having a desirable alternating voltage component and an undesirable direct voltage component; and means for applying to said motor a unidirectional voltage opposing in polarity said direct voltage component and of such magnitude as to substantially neutralize the direct voltage component and which creates a braking effect when the power applied to said motor is reduced to zero.

14. In a motor control system, in combination: an alternating current motor; means for controlling the application of power from a source of alternating power to said motor, said means including an electronic rectifier having a control electrode and which operates to supply a rectified alternating voltage to said motor in accordance with the potential of said control electrode, said rectified voltage having a desirable alternating voltage component and an undesirable direct voltage component; and means for applying to said motor a unidirectional voltage opposing in polarity said direct voltage component and of such magnitude as to substantially neutralize the direct voltage component so as to improve the operation of the motor when power is applied thereto.

15. In a motor control system, in combination: an alternating current motor; means for controlling the application of power from a source of alternating power to said motor, said means including an electronic rectifier having a control electrode and which operates to supply a rectified alternating voltage to said motor in accordance with the potential of said control electrode, said rectified voltage having a desirable alternating voltage component and an undesirable direct voltage component; and means for applying to said motor a unidirectional voltage opposing in polarity said direct voltage component and of such magnitude as to substantially neutralize the direct voltage component so as to improve the operation of the motor when power is applied thereto and which creates a braking effect when the power applied to said motor is reduced to zero.

16. In a motor control system, an alternating current motor having a field winding, normally balanced control means, means including a first and a second electronic discharge device for applying to said winding a first cyclically varying voltage having a unidirectional component due to the rectifying properties of said discharge devices, said discharge devices each having a control element, means electrically connecting said control elements together, means for varying the potential applied to said control elements in accordance with the unbalance of said control means so that the magnitude and polarity of said cyclically varying voltage is dependent upon the extent and direction of unbalance of said control means, and means for continuously applying to said winding a second cyclically varying unidirectional voltage opposing in polarity the unidirectional component of said cyclically varying voltage such as to improve the operation of the motor when power is applied thereto and which creates a braking effect when said first cyclically varying voltage is reduced to zero.

17. In a motor control system, an alternating current motor having a field winding, normally balanced control means, means including a first and a second gas filled electronic discharge device for applying to said winding a cyclically varying voltage having a unidirectional component due to the rectifying properties of said discharge devices, said discharge devices each having a control element, means electrically connecting said control elements together, means for varying the potential applied to said control elements in accordance with the unbalance of said control means so that the magnitude and polarity of said cyclically varying voltage is dependent upon the extent and direction of unbalance of said control means, means for producing a unidirectional voltage, means for applying a portion of said unidirectional voltage to said control elements to bias the same, and means for continuously applying to said winding a different portion of said unidirectional voltage opposing in polarity the unidirection component of said cyclically varying voltage such as to improve the operation of the motor when power is applied thereto and which creates a braking effect when said cyclically varying voltage is reduced to zero.

18. In a motor control system, an alternating current motor having a field winding, normally balanced control means, means including a first and a second vacuum type electronic discharge device for applying to said winding a cyclically varying voltage having a unidirectional component due to the rectifying properties of said discharge devices, means whereby the magnitude and polarity of said voltage is dependent upon the magnitude and direction of unbalance of said control means, and means including a first and a second electronic rectifier for continuously applying to said winding a unidirectional voltage opposing in polarity the unidirectional component of said cyclically varying voltage such as to improve the operation of the motor when power is applied thereto, and which creates a braking effect when said cyclically varying voltage is reduced to zero.

WILLIAM J. FIELD.

No references cited.